US008001049B2

(12) United States Patent
Sobel et al.

(10) Patent No.: US 8,001,049 B2
(45) Date of Patent: Aug. 16, 2011

(54) DATA SUBMISSION FOR ANTI-FRAUD CONTEXT EVALUATION (75) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 994 days.

(21) Appl. No.: 11/860,686

(22) Filed: Sep. 25, 2007

(65) Prior Publication Data

US 2010/0268644 A1    Oct. 21, 2010

(51) Int. Cl.
*G06Q 40/00* (2006.01)
(52) U.S. Cl. .......................................... 705/44; 705/30
(58) Field of Classification Search ............... 705/10–44
See application file for complete search history.

(56) References Cited

U.S. PATENT DOCUMENTS

2002/0169720 A1*  11/2002  Wilson et al. ............... 705/44
2003/0182194 A1*  9/2003  Choey et al. ............... 705/16

OTHER PUBLICATIONS

"Statement in Accordance with the Notice from the European Patent Office dated Oct. 1, 2007 concerning business methods (OJ Nov. 2007; p. 592-593)", XP002456252.

* cited by examiner

*Primary Examiner* — Frantzy Poinvil
(74) *Attorney, Agent, or Firm* — Gunnison, McKay & Hodgson, L.L.P.; Forrest Gunnison (57) ABSTRACT Contextual data is gathered about a user's known location and/or about a user's expected location and generates contextual indicators based on at least a portion of the gathered contextual data. The contextual indicators are provided to one or more relying parties, such as an anti-fraud system to allow the anti-fraud system to more effectively determine the validity of transactions associated with the user, such as credit card transactions associated with the user's credit card.

16 Claims, 5 Drawing Sheets

DATA SUBMISSION FOR ANTI-FRAUD CONTEXT EVALUATION

BACKGROUND OF THE INVENTION

1. Field of the Invention

The present invention relates to computer systems. More particularly, the present invention relates to transaction security and anti-fraud systems.

2. Description of Related Art

Many conventional anti-fraud systems, such as anti-fraud systems utilized by credit card companies, analyze a credit card holder's spending history to attempt to determine if a specific charge should be allowed, denied, or in some cases further authenticated. Some analysis methods make the determination utilizing disruptive means, such as a phone call to the credit card holder from a financial institution's security division. These procedures often result in significant delay and even embarrassment to the credit card holder attempting to make a valid purchase.

SUMMARY OF THE INVENTION

In accordance with one embodiment of the invention, a method for generating and providing contextual indicators associated with the location of a valid user, such as a credit card holder, to a relying party, such as an anti-fraud system, includes: obtaining contextual data associated with the user from one or more contextual data sources; generating one or more contextual indicators based on at least a portion of the contextual data; and providing the one or more contextual indicators to one or more relying parties.

Embodiments described herein are best understood by reference to the following detailed description when read in conjunction with the accompanying drawings.

BRIEF DESCRIPTION OF THE DRAWINGS

Common reference numerals are used through the drawings and detailed description to indicate like elements.

DETAILED DESCRIPTION

Some conventional anti-fraud systems attempt to determine the validity of a transaction, such as a credit card purchase, by analyzing historical transactions as well as the type of transactions performed. The result of the analysis is typically a score of how likely a particular charge is fraudulent. The anti-fraud systems score certain items, such as the proximity of transaction to the card owner's home address location, as part of the scoring.

For example, if a credit card user drives to an area outside of the credit card owner's home address area and attempts to use the credit card, the use of the credit card may be declined as the anti-fraud system may determine that is unlikely that the credit card user is at that particular location, i.e., because the location is out the credit card owner's home address area. However, if the credit card user purchased gas in route to the new location, or purchased an airline ticket with the same credit card to the new location, the anti-fraud system is less likely to view the charge as fraudulent as the system has data that suggests that the user has traveled to the new area.

In some instances, no data of the credit card user's movement to the new area is received, and credit card purchases are denied until the credit card owner informs the credit card company of his travel to the new location. On return to his "home area", the credit card user may again have to inform the credit card company of his return to the "home area". Conversely, in less stringent anti-fraud systems, fraudulent charges may be allowed in areas where the credit card user has never been so that the credit card user's use of the credit card is not disrupted.

Embodiments in accordance with the invention gather contextual data about a user's known location and/or about a user's expected location and generate contextual indicators based on at least a portion of the gathered contextual data. The contextual indicators are then provided to one or more relying parties, such as an anti-fraud system of a credit card company, to allow the anti-fraud system to more effectively determine the validity of transactions, such as credit card purchases.

In one embodiment, a local contextual indicator application gathers contextual data such as known location information associated with a user and/or expected location information associated with a user from one or more contextual data sources, such as from calendar applications, a geo-location device, a geo-location service, a cell phone, a computer lap top device, a connectivity service, by triangulation or other geographic location determination methods, and from other means, including self-attestation by the user. In some embodiments, the known location information and the expected location information include physical location information as well as time period information, if any, such as the length of the time the user is expected to remain at a known location or at an expected location.

In one embodiment, the local contextual indicator application generates one or more contextual indicators based on at least a portion of the contextual data and provides the one or more contextual indicators to relying parties, such as one or more of the user's financial institutions and/or third parties acting as trusted intermediaries, such as an anti-fraud system of a credit card company. In some embodiments, the contextual indicators are automatically generated and provided to the relying parties, for example, on user log-in to the local contextual indicator application. In some embodiments, the contextual indicators are provided to the relying parties on user confirmation.

In one embodiment, for privacy reasons the granularity, i.e., the level of detail, of the location information provided in a contextual indicator is adjustable, i.e., can be obfuscated, by reporting physical location information at a city or regional level, rather than at a specific address. In some embodiments, the granularity of the location information provided in a contextual indicator to a relying party is set at a default level. In some embodiments, the granularity of the location information provided in a contextual indicator to a relying party is user selectable.

Figure 2:
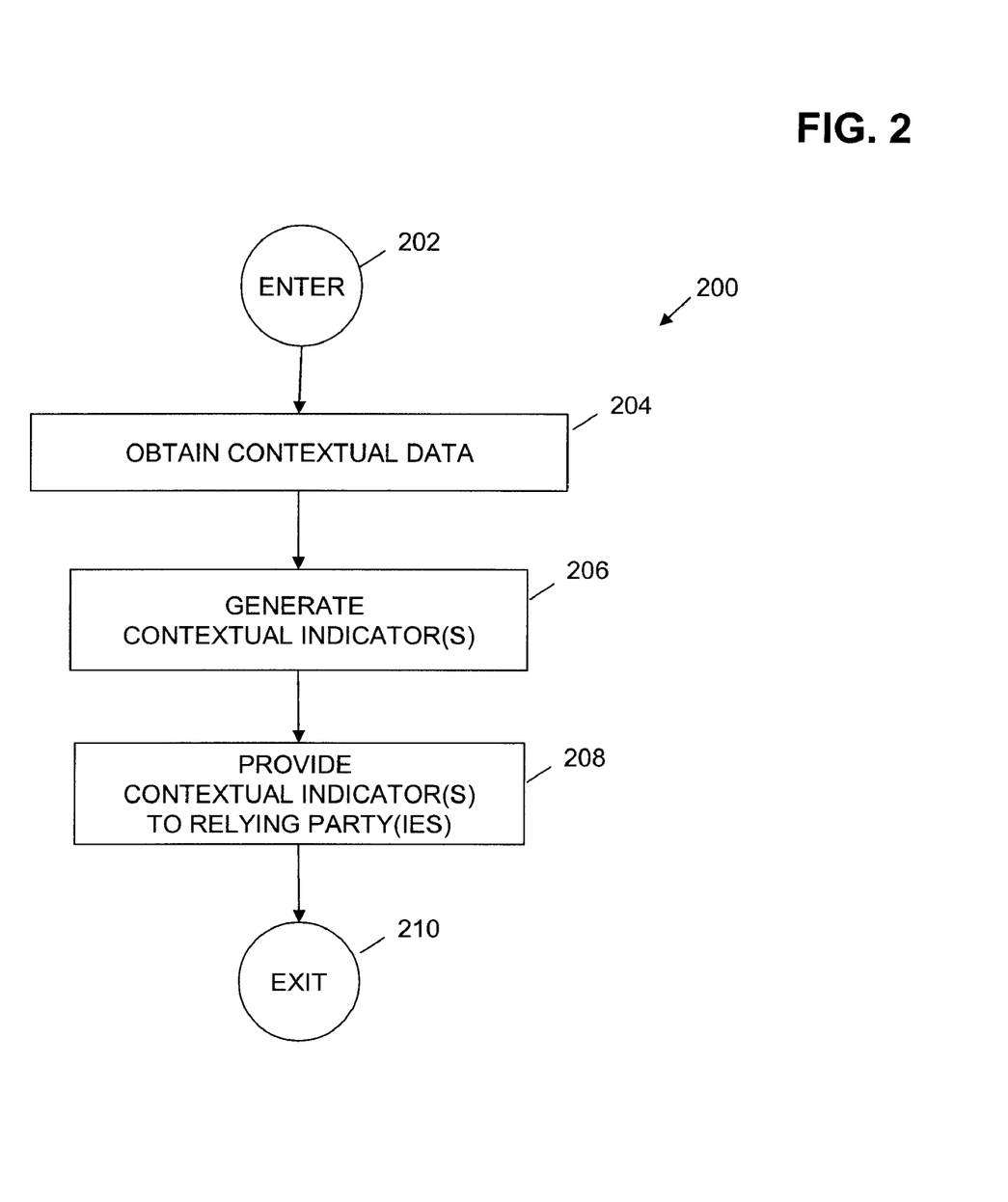
FIG. 2 illustrates a flow diagram of a method 200 for generating contextual indicators and providing the contextual indicators to a relying party in accordance with one embodiment of the invention.

Referring now generally to FIG. 2, in one embodiment, contextual data associated with a valid user is obtained from one or more contextual data sources (operation 204). One or more contextual indicators associated with the user are generated based on at least a portion of the contextual data (operation 206), and the contextual indicators are provided to a relying party, such as an anti-fraud system of a credit card company (operation 208). The contextual indicators allow the relying party to more effectively determine the validity of a transaction associated with the user, such as a credit card purchase, by corroborating or conflicting with transaction information received by the relying party. For example, if a contextual indicator provided to an anti-fraud system indicates that a credit card holder is currently in Palo Alto, Calif., and a suspect credit card purchase for dinner is originated in Paris, France, the contextual indicator would conflict with the transaction information being evaluated by the anti-fraud system. As another example, if a contextual indicator provided to the anti-fraud system indicates the credit card holder is expected to travel to Naples, Italy the next week, and a suspect credit card purchase for dinner is originated in Naples, Italy that week, the contextual indicator would corroborate the transaction information being evaluated by the anti-fraud system.

Figure 1:
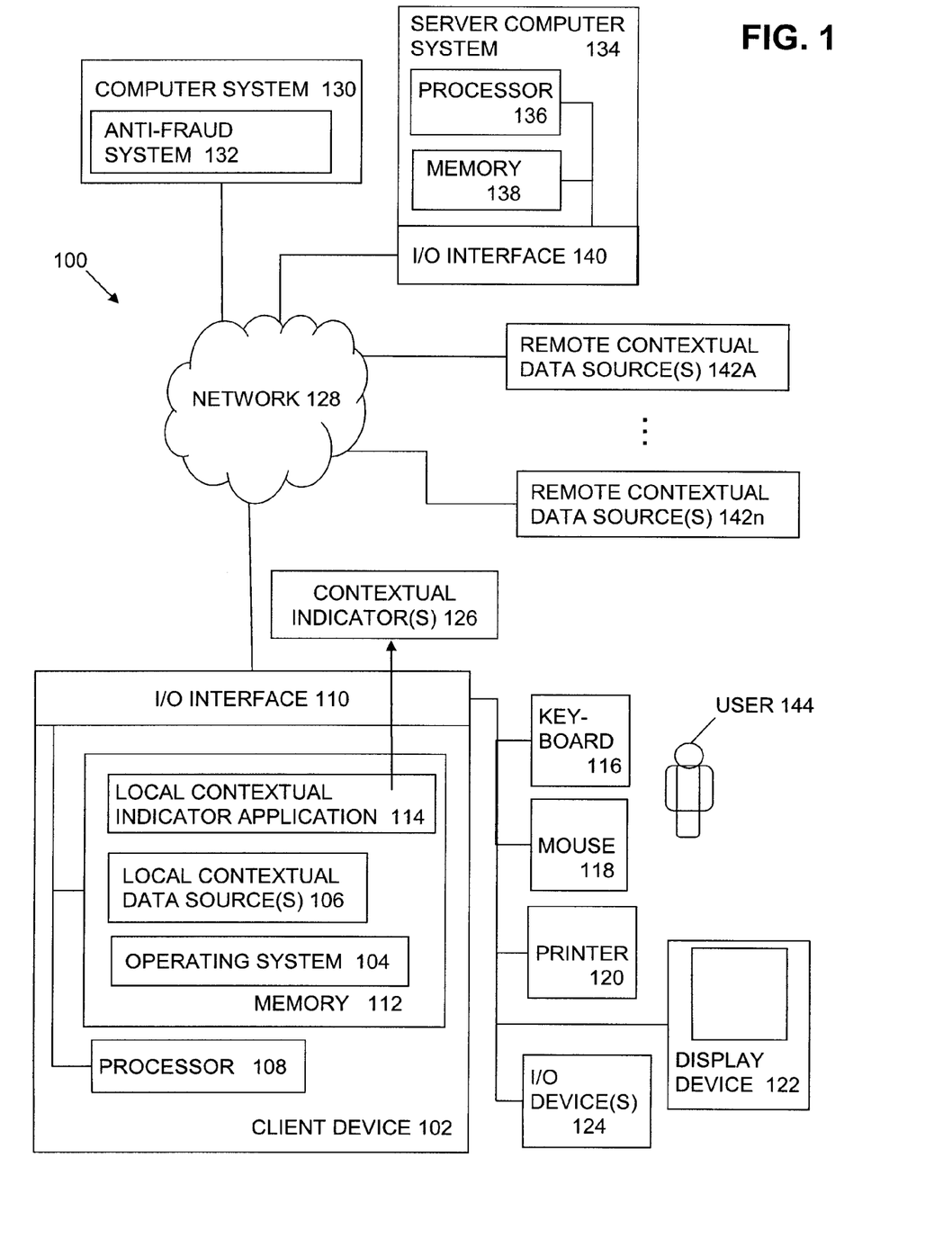
FIG. 1 is a diagram of a computer system that includes a local contextual indicator application executing on a client device in accordance with one embodiment of the invention.

More particularly, FIG. 1 is a diagram of a computer system 100 that includes a local contextual indicator application 114 executing on a client device 102, e.g., a first computer system, in accordance with one embodiment of the present invention. Client device 102, sometimes called a user device, typically includes a central processing unit (CPU) 108, hereinafter processor 108, an input output (I/O) interface 110, and a memory 112, including an operating system 104.

In one embodiment, memory 112 includes local contextual indicator application 114. In one embodiment, local contextual indicator application 114 obtains contextual data from local contextual data source(s) and/or one or more remote contextual data source(s), generates one or more contextual indicators based on at least a portion of the gathered contextual data, and provides the one or more contextual indicators to one or more relying parties, such as an anti-fraud system of a credit card company or financial institution.

In one embodiment, memory 112 further includes one or more local contextual data source(s) 106, such as a calendar application or a geo-location device. In one embodiment, local contextual data source(s) 106 includes contextual data associated with a user 144, such as known location information and/or expected location information. Herein contextual data obtained from local contextual data source(s) 106 is also referred to as local contextual data. Herein, in one embodiment, user 144 is a valid transactional entity, such as a valid credit card holder, or valid bank account owner, unless otherwise indicated.

Client device 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from client device 102. In one embodiment, local contextual indicator application 114 is loaded into client device 102 via I/O device 124, such as from a CD, DVD or floppy disk containing local contextual indicator application 114. Although client device 102 is illustrated in FIG. 1 as a computer system, client device 102 can be a portable computer, a workstation, a two-way pager, a cellular telephone, a digital wireless telephone, a personal digital assistant, a server computer, an Internet appliance, or any other device that includes components that can execute the functionality in accordance with at least one of the embodiments as described herein.

Client device 102 is coupled to external systems by a network 128, e.g., the Internet. For example, as shown in FIG. 1 client device 102 is coupled to one or more remote contextual data source(s) 142A-142n, as well as one or more relying parties, such as an anti-fraud system 132 of a computer system 130.

In one embodiment, remote contextual data source(s) 142A-142n include contextual data for providing to local contextual indicator application 114. Herein in one embodiment, contextual data obtained from remote contextual data source(s) 142A-142n is also referred to as remote contextual data. In one embodiment, remote contextual data source(s) 142A-142n include calendar applications, a geo-location device, a geo-location service, a cell phone, a personal digital assistant device, a computer lap top device, a connectivity service, triangulation or other geographic location determination methods, and/or other means for providing contextual data to local contextual indicator application 114. In some embodiments, remote contextual data source(s) 142A-142n include a central processing unit, an input output (I/O) interface, and a memory, and may further include standard devices like a keyboard, a mouse, a printer, a display device and an I/O device(s), not illustrated to avoid detracting from the principles of the invention.

In one embodiment, computer system 130 can be a server computer system utilized by a relying party, such as a bank or a credit card company. In one embodiment, computer system 130 includes anti-fraud system 132 that receives and utilizes contextual indicators generated by local contextual indicator application 114 in determining whether a transaction, such as a credit card transaction, is fraudulent. In some embodiments, computer system 130 includes a central processing unit, an input output (I/O) interface, and a memory, and may further include standard devices like a keyboard, a mouse, a printer, a display device and an I/O device(s), not illustrated to avoid detracting from the principles of the invention.

In some embodiments, client device 102 is further coupled to a server computer system 134 by network 128. Server computer system 134, e.g., a second computer system, typically includes a central processing unit (CPU) 136, hereinafter processor 136, an input/output (I/O) interface 140, and a memory 138 including an operating system (not shown). Server computer system 134 may further include standard devices like a keyboard, a mouse, a printer, and a display device, as well as, one or more standard input/output (I/O) devices, such as a compact disk (CD) or DVD drive, floppy disk drive, or other digital or waveform port for inputting data to and outputting data from server computer system 134.

Network 128 can be any network or network system that is of interest to a user. In various embodiments, network interfaces, such as I/O interface 110 and 140, include analog modems, digital modems, or a network interface card. The particular type of and configuration of client device 102, computer system 130, server computer system 134, and remote contextual data source(s) 142A-142n are not essential to this embodiment of the present invention.

FIG. 2 illustrates a flow diagram of a method 200 for generating contextual indicators and providing the contextual indicators to a relying party in accordance with one embodiment of the invention. Referring now to FIGS. 1 and 2 together, in one embodiment, execution of local contextual indicator application 114 by processor 108 results in the operations of method 200 as described below. In some embodiments, a user authentication procedure can be required prior to entering method 200. One example of a user authentication procedure is described herein in more detail with reference to operations 302 through 310 of FIG. 3. Method 200 is entered at an ENTER operation 202 with processing transitioning to an OBTAIN CONTEXTUAL DATA 204.

In OBTAIN CONTEXTUAL DATA operation 204, local contextual indicator application 114 obtains contextual data from one or more local contextual data source(s) 106 and/or from one or more remote contextual data source(s) 142A-142n. In one embodiment, contextual data includes known location contextual data associated with a particular user, such as user 144, and/or expected location contextual data associated with a particular user, such user 144. In one embodiment, the particular user, i.e., user 144, is a valid transactional entity, such as a valid credit card holder, or a valid bank account owner, with a relying party.

In one embodiment, known location contextual data includes the known physical location of a user at the time the known location contextual data is obtained, and can include the time period the user will be at the known physical location, herein termed the known location time period. In one embodiment, the known physical location can be a specific street address, a city, a county, a region, a state, a country, or other geographic location identifier. In one embodiment, the known location time period can be a date, a date range, a clock time, or a representation that conveys a time period the user is in the known physical location. In some embodiments, the known location contextual data is obtained substantially real-time.

In one embodiment, expected location contextual data includes the expected physical location of a user at a time subsequent to the time the expected location contextual data is obtained, and can include the time period the user is expected be at the expected physical location, herein termed the expected location time period. In one embodiment, the expected physical location can be a specific street address, a city, a county, a region, a state, a country, or other geographic location identifier. In one embodiment, the expected location time period can be a date, a date range, a clock time, or a representation that conveys a time period the user is expected to be at the expected physical location.

In one embodiment, local contextual indicator application 114 generates contextual data requests for contextual data that are sent to local contextual data source(s) 106 and/or remote contextual data source(s) 142A-142n. Local contextual indicator application 114 receives the contextual data returned in response to the contextual data request(s). In some embodiments, the frequency of the contextual data requests is automatically set based on the reporting requirements of one or more of the relying parties. In some embodiments, the frequency of the requests is user adjustable, or defined by a default frequency setting.

In another embodiment, local contextual indicator application 114 does not generate contextual data requests, but instead automatically receives contextual data sent from local contextual data source(s) 106 and/or remote contextual data source(s) 142A-142N. Thus, in this other embodiment, local contextual indicator application 114 can asynchronously receive contextual data from various contextual data sources, for example, dependent on the sending patterns of each of the contextual data sources. In one embodiment, the returned contextual data is then stored, such as in a memory structure of memory 112. In this embodiment, the stored contextual data is obtained by local contextual indicator application 114.

From OBTAIN CONTEXTUAL DATA operation 204, processing transitions to a GENERATE CONTEXTUAL INDICATOR(S) operation 206.

In GENERATE CONTEXTUAL INDICATORS operation 206, local contextual indicator application 114 generates one or more contextual indicators based on at least a portion of the contextual data obtained in operation 204. In one embodiment, contextual indicators include known location contextual indicators and/or expected location contextual indicators.

In one embodiment, a known location contextual indicator identifies a known location of the user at the time the known location information was obtained, and may further include a known location time period. In one embodiment, an expected location contextual indicator identifies an expected location of the user at a time subsequent to the time the expected location information was obtained, and may further include an expected location time period.

As earlier described, in one embodiment, for privacy reasons the granularity, i.e., the level of detail, of the known and/or expected location information provided in a contextual indicator is adjustable, i.e., can be obfuscated, by reporting physical location information at a city or regional level, rather than at a specific address. In some embodiments, the granularity of the location information provided in a contextual indicator to a relying party is user selectable. In some embodiments, the granularity of the location information provided in a contextual indicator is set at a default level. From GENERATE CONTEXTUAL INDICATOR(S) operation 206, processing transitions to a PROVIDE CONTEXTUAL INDICATOR(S) TO RELYING PARTY(IES) operation 208.

In PROVIDE CONTEXTUAL INDICATOR(S) TO RELYING PARTY(IES) operation 208, one or more of the contextual indicators generated in operation 206 are provided to one or more relying parties, e.g., anti-fraud system 132. As earlier described, in some embodiments, the contextual indicators are sent to one or more relying parties based on a reporting frequencies required by the one or more of the relying parties. In some embodiments, the contextual indicators are sent based upon a user selected frequency. From PROVIDE CONTEXTUAL INDICATOR(S) TO RELYING PARTY(IES) operation 208, processing transitions to an EXIT operation 210 with processing exiting method 200.

Figure 3:
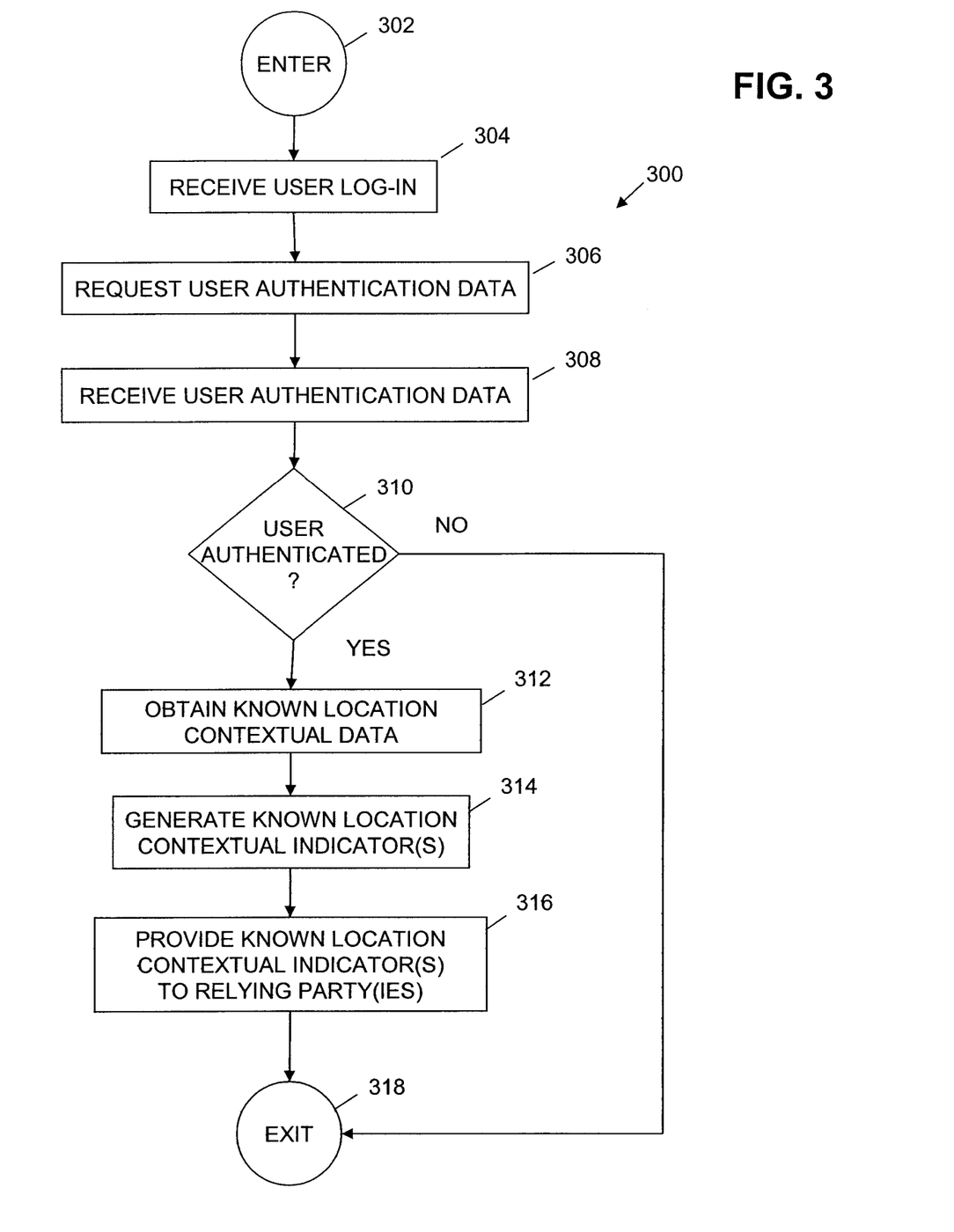
FIG. 3 illustrates a flow diagram of a method for generating known location contextual indicators and providing the known location contextual indicators to a relying party in accordance with one embodiment of the invention.

FIG. 3 illustrates a flow diagram of a method 300 for generating known location contextual indicators and providing the known location contextual indicators to a relying party in accordance with one embodiment of the invention. Referring now to FIGS. 1 and 3 together, in one embodiment, execution of local contextual indicator application 114 by processor 108 results in the operations of method 300 as described below. Method 300 is entered at an ENTER operation 302 with processing transitioning to RECEIVE USER LOG-IN operation 304.

In RECEIVE USER LOG-IN operation 304, a user, e.g., user 144 (FIG. 1), logs into local contextual indicator application 114. For example, a user may open local contextual indicator application 114 from a graphical user interface displayed on client device 102, such as by clicking on an associated icon in a desktop screen display. From RECEIVE USER LOG-IN operation 304, processing transitions to a REQUEST USER AUTHENTICATION DATA operation 306.

In REQUEST USER AUTHENTICATION DATA operation 306, local contextual indicator application 114 generates and sends a request for the user to input user authentication data, such as a user name and/or password. In one embodiment, the request is displayed to the user as a graphical user interface providing input field(s) for the requested user authentication data. From REQUEST USER AUTHENTICATION DATA operation 306, processing transitions to a RECEIVE USER AUTHENTICATION DATA operation 308.

In RECEIVE USER AUTHENTICATION DATA operation 308, local contextual indicator application 114 receives user authentication data input by the user in response to the request for user authentication data generated in operation 306. From RECEIVE USER AUTHENTICATION DATA operation 308, processing transitions to a USER AUTHENTICATED check operation 310.

In USER AUTHENTICATED check operation 310, a determination is made whether or not the user is authenticated based upon the user authentication data input in operation 308. For example, in one embodiment, the user authentication data input in operation 308 is compared to stored user authentication data, for example, initially stored on installation and set up of local contextual indicator application 114. In one embodiment, if the user authentication data input in operation 308 matches the stored user authentication data, a determination is made that the user is authenticated, otherwise the user is not authenticated.

In one embodiment, when the user is not authenticated ("NO"), processing transitions from USER AUTHENTICATED operation 310 to an EXIT operation 318, with processing exiting method 300, or optionally returning to operation 304 on receipt of a next user log-in. In some embodiments, a notification is displayed to the user advising the user that the authentication failed. Optionally, in some embodiments, the notification provides input fields allowing the user to re-input the user authentication data, and/or to exit. Alternatively, in one embodiment, when the user is authenticated ("YES"), processing transitions from USER AUTHENTICATED operation 310 to an OBTAIN KNOWN LOCATION CONTEXTUAL DATA operation 312.

In OBTAIN KNOWN LOCATION CONTEXTUAL DATA operation 312, known location contextual data is obtained from one or more local contextual data source(s) 106 and/or from one or more remote contextual data source(s) 142A-142n. As earlier described, in one embodiment, known location contextual data includes the known physical location of a user at the time the known location contextual data is obtained, and can include the known location time period. In one embodiment, the known physical location can be a specific street address, a city, a county, a region, a state, a country, or other geographic location identifier.

In one embodiment, in response to a successful user authentication, local contextual indicator application 114 generates one or more requests, e.g., queries, for known location contextual data that are sent to local contextual data source(s) 106 and/or remote contextual data source(s) 142A-142n. Local contextual indicator application 114 then receives the returned known location contextual data provided in response. In one embodiment, the returned known location contextual data can be stored, such as in a memory structure of memory 112.

In another embodiment, local contextual indicator application 114 automatically receives known location contextual data sent from local contextual data source(s) 106 and/or remote contextual data source(s) 142A-142n, and stores the received known location contextual data, such as in a memory structure of memory 112. In this example, the stored known location contextual data is obtained by local contextual indicator application 114 when needed.

In some embodiments, local contextual indicator application 114 automatically generates one or more requests for known location contextual data that are asynchronously sent to local contextual data source(s) 106 and/or remote contextual data source(s) 142A-142n, i.e., are sent independent of user authentication at operation 310. The returned known location contextual data is then stored, such as in a memory structure of memory 112. In this embodiment, the stored known location contextual data is obtained by local contextual indicator application 114 when needed.

In some embodiments, the frequency of the requests is automatically set based on the reporting requirements of one or more of the relying parties. In some embodiments, the frequency of the requests is user adjustable, or set by default. From OBTAIN KNOWN LOCATION CONTEXTUAL DATA operation 312, processing transitions to a GENERATE KNOWN LOCATION CONTEXTUAL INDICATOR(S) operation 314.

In GENERATE KNOWN LOCATION CONTEXTUAL INDICATOR(S) operation 314, local contextual indicator application 114 generates one or more known location contextual indicators based on at least a portion of the known location contextual data obtained in operation 312. In one embodiment, a known location contextual indicator identifies a known location of the user at the time the known location contextual data was obtained, and may further include a known time period.

As earlier described, in one embodiment, for privacy reasons the granularity, i.e., the level of detail, of the location information provided in a known location contextual indicator is adjustable, i.e., can be obfuscated, by reporting a known physical location at a city or regional level, rather than at a specific address. In some embodiments, the granularity of the known physical location information provided in a contextual indicator to a relying party is user selectable, or set at a default setting. From GENERATE KNOWN LOCATION CONTEXTUAL INDICATOR(S) operation 314, processing transitions to a PROVIDE KNOWN LOCATION CONTEXTUAL INDICATOR(S) TO RELYING PARTY(IES) operation 316.

In PROVIDE KNOWN LOCATION CONTEXTUAL INDICATOR(S) TO RELYING PARTY(IES) operation 316, one or more of the known location contextual indicators generated in operation 314 are provided to one or more relying parties, e.g., anti-fraud system 132. In one embodiment, the known location contextual indicators are automatically provided to pre-identified relying parties, such as a listing of relying parties identified on installation and set-up and/or update of local contextual indicator application 114. In some embodiments, a graphical user interface is generated and displayed to the user including user input fields that permit a user to select or deselect each relying party to receive the known location contextual indicators. From PROVIDE CONTEXTUAL INDICATOR(S) TO RELYING PARTY (IES) operation 316, processing transitions to an EXIT operation 318 with processing exiting method 300 as earlier described, or optionally returning to operation 304 on receipt of a next user log-in.

Figure 4:
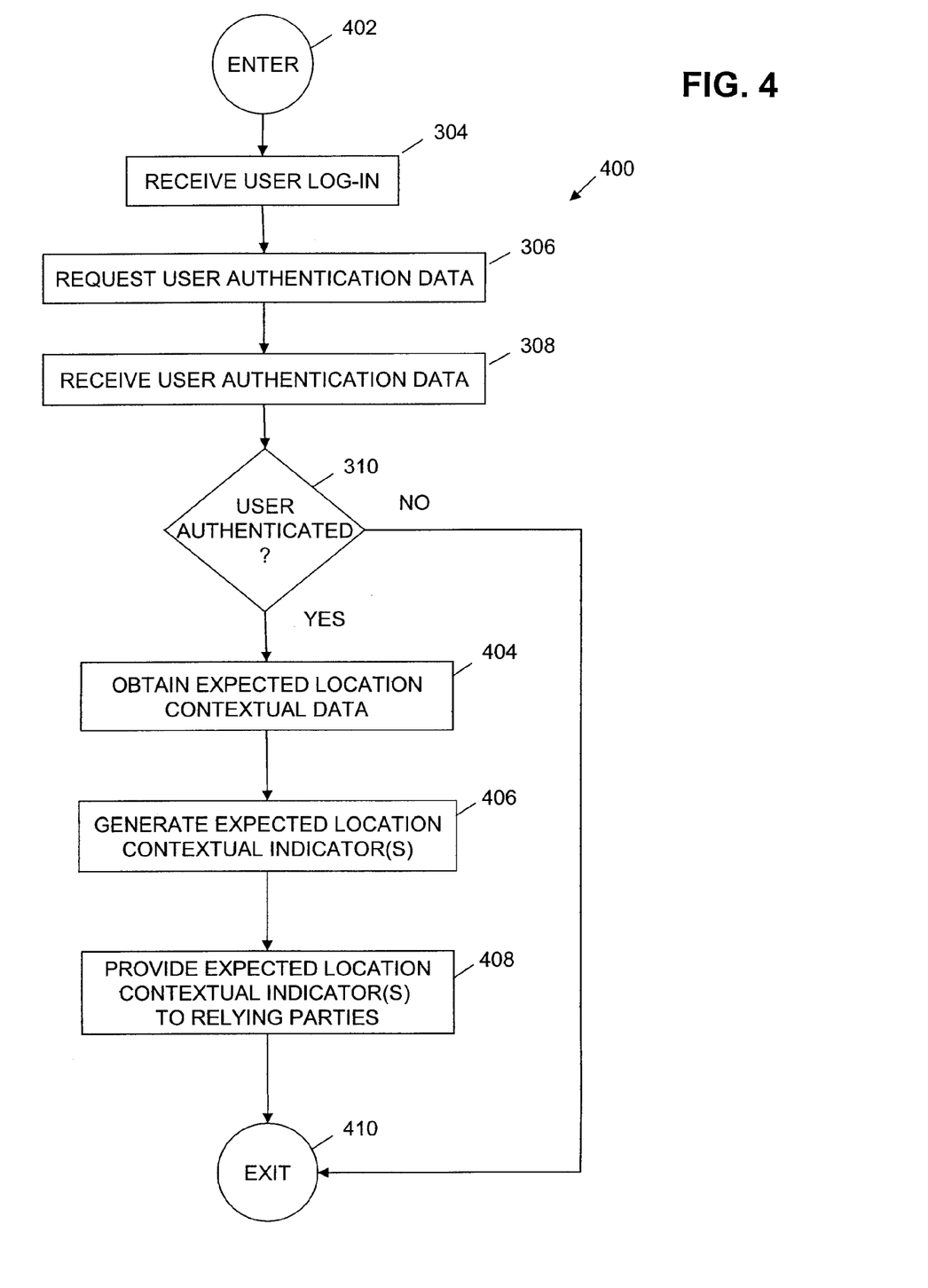
FIG. 4 illustrates a flow diagram of generating expected location contextual indicators and providing the expected location contextual indicators to a relying party in accordance with one embodiment of the invention.

FIG. 4 illustrates a flow diagram of a method 400 for generating expected location contextual indicators and providing the expected location contextual indicators to a relying party in accordance with another embodiment of the invention. Referring now to FIGS. 1 and 4 together, in one embodiment, execution of local contextual indicator application 114 by processor 108 results in the operations of method 400 as described below. Method 400 is entered at an ENTER operation 402 with processing transitioning to RECEIVE USER LOG-IN operation 304.

In RECEIVE USER LOG-IN operation 304, a user logs into local contextual indicator application 114, and processing transitions from RECEIVE USER LOG-IN operation 306, through operation 306, 308, and 310, as earlier described with reference to method 300, hereby incorporated by reference.

In USER AUTHENTICATED check operation 310, in one embodiment, when the user is not authenticated ("NO"), processing transitions from USER AUTHENTICATED operation 310 to an EXIT operation 410, with processing exiting method 400, or optionally returning to operation 304 (FIG. 4) on receipt of a next user log-in. In one embodiment, when the user is authenticated ("YES"), processing transitions from USER AUTHENTICATED operation 310 to an OBTAIN EXPECTED LOCATION CONTEXTUAL DATA operation 404.

In OBTAIN EXPECTED LOCATION CONTEXTUAL DATA operation 404, expected location contextual data is obtained from one or more local contextual data source(s) 106 and/or from one or more remote contextual data source(s) 142A-142n. As earlier described, in one embodiment, expected location contextual data includes the expected physical location of a user at a time subsequent to the time the expected location contextual data is obtained, and can include the expected location time period. In one embodiment, the expected physical location can be a specific street address, a city, a county, a region, a state, a country, or other geographic location identifier.

In one embodiment, in response to user authentication, local contextual indicator application 114 generates one or more requests, e.g., queries, for expected location contextual data that are sent to local contextual data source(s) 106 and/or remote contextual data source(s) 142A-142n. Local contextual indicator application 114 then receives the returned expected location contextual data.

In another embodiment, local contextual indicator application 114 automatically receives expected location contextual data sent from local contextual data source(s) 106 and/or remote contextual data source(s) 142A-142N, and stores the received expected location contextual data such as in a memory structure of memory 112. In this example, the stored expected location contextual data is obtained by local contextual indicator application 114 when needed.

In some embodiments, local contextual indicator application 114 automatically generates one or more requests for expected location contextual data that are asynchronously sent to local contextual data source(s) 106 and/or remote contextual data source(s) 142A-142n, i.e., are sent independent of user authentication at operation 310. The returned expected location contextual data is then stored, such as in a memory storage structure of memory 112. In this embodiment, the stored expected location contextual data is obtained by local contextual indicator application 114 from the memory storage structure of memory 112.

In some embodiments, the frequency of the requests is automatically set based on the reporting requirements of one or more of the relying parties. In some embodiments, the frequency of the requests is user adjustable. From OBTAIN EXPECTED LOCATION CONTEXTUAL DATA operation 404, processing transitions to a GENERATE EXPECTED LOCATION CONTEXTUAL INDICATOR(S) operation 406.

In GENERATE EXPECTED LOCATION CONTEXTUAL INDICATOR(S) operation 406, local contextual indicator application 114 generates one or more expected location contextual indicators based on at least a portion of the expected location contextual data obtained in operation 404. In one embodiment, an expected location contextual indicator identifies an expected location of the user at the time subsequent to the time the expected location contextual data was obtained, and may further include an expected time period.

As earlier described, in one embodiment, for privacy reasons the granularity, i.e., the level of detail, of the expected location information provided in an expected location contextual indicator is adjustable, i.e., can be obfuscated, by reporting an expected physical location at a city or regional level, rather than at a specific address. In some embodiments, the granularity of the expected physical location information provided in a contextual indicator to a relying party is user selectable or set at a default level. From GENERATE EXPECTED LOCATION CONTEXTUAL INDICATOR(S) operation 406, processing transitions to a PROVIDE EXPECTED LOCATION CONTEXTUAL INDICATOR(S) TO RELYING PARTY(IES) operation 408.

In PROVIDE EXPECTED LOCATION CONTEXTUAL INDICATOR(S) TO RELYING PARTY(IES) operation 408, one or more of the expected location contextual indicators generated in operation 406 are provided to one or more relying parties, e.g., anti-fraud system 132. In one embodiment, the expected location contextual indicators are automatically provided to one or more pre-identified relying parties, such as a listing of relying parties identified on installation and set-up and/or update of local contextual indicator application 114. In some embodiments, a graphical user interface is generated and displayed to the user including user input fields that permit a user to select or deselect each relying party to receive the expected location contextual indicators. From PROVIDE EXPECTED LOCATION CONTEXTUAL INDICATOR(S) TO RELYING PARTY(IES) operation 408, processing transitions to an EXIT operation 410 with processing exiting method 400 as earlier described, or optionally returning to operation 304 (FIG. 4) on receipt of a next user log-in.

Figure 5:
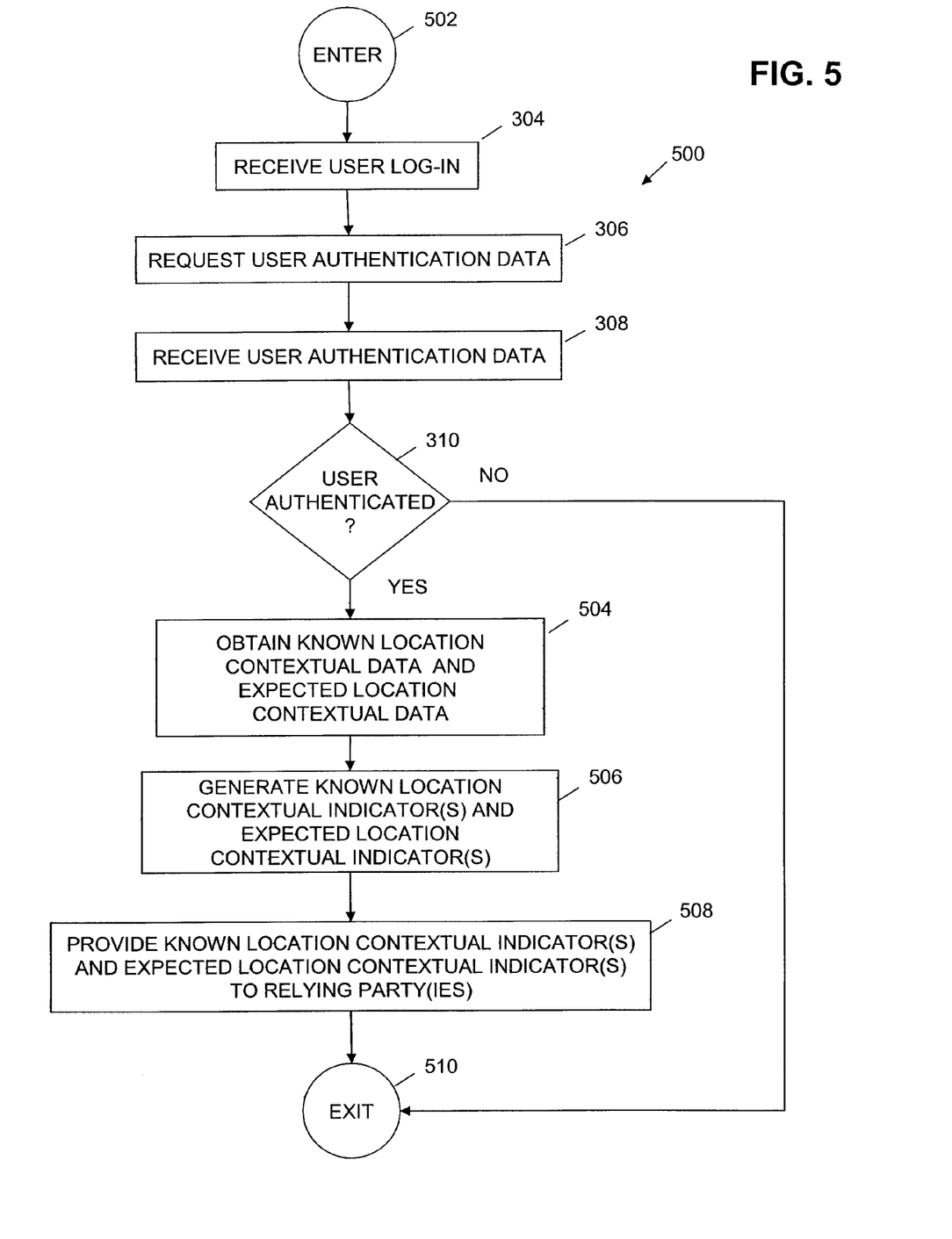
FIG. 5 illustrates a flow diagram of a method for generating known location contextual indicators and expected location contextual indicators and providing the known location contextual indicators and the expected location contextual indicators to a relying party in accordance with one embodiment of the invention.

FIG. 5 illustrates a flow diagram of a method 500 for generating known location contextual indicators and expected location contextual indicators and providing the known location contextual indicators and the expected location contextual indicators to a relying party in accordance with another embodiment of the invention. Referring now to FIGS. 1, 3, 4 and 5 together, in one embodiment, execution of local contextual indicator application 114 by processor 108 results in the operations of method 500 as described below. Method 500 is entered at an ENTER operation 502 with processing transitioning to RECEIVE USER LOG-IN operation 304.

In RECEIVE USER LOG-IN operation 304, a user logs into local contextual indicator application 114, and processing transitions from RECEIVE USER LOG-IN operation 306, through operation 306, 308, and 310, as earlier described with reference to method 300, hereby incorporated by reference.

In USER AUTHENTICATED check operation 310, in one embodiment, when the user is not authenticated ("NO"), processing transitions from USER AUTHENTICATED operation 310 to an EXIT operation 510, with processing exiting method 500, or optionally returning to operation 304 (FIG. 5) on receipt of a next user log-in. In one embodiment, when the user is authenticated ("YES"), processing transitions from USER AUTHENTICATED operation 310 to an OBTAIN KNOWN LOCATION CONTEXTUAL DATA AND EXPECTED LOCATION CONTEXTUAL DATA operation 504.

In OBTAIN KNOWN LOCATION CONTEXTUAL DATA AND EXPECTED LOCATION CONTEXTUAL DATA operation 504, known location data is obtained from one or more local contextual data source(s) 106 and/or from one or more remote contextual data source(s) 142A-142n as earlier described with reference to operation 312 (FIG. 3), hereby incorporated by reference. Also, expected location contextual data is obtained from one or more local contextual data source(s) 106 and/or from one or more remote contextual data source(s) 142A-142n as earlier described with reference to operation 404 (FIG. 4), hereby incorporated by reference. From OBTAIN KNOWN LOCATION CONTEXTUAL DATA AND EXPECTED LOCATION CONTEXTUAL DATA operation 504, processing transitions to a GENERATE KNOWN LOCATION CONTEXTUAL INDICATOR(S) AND EXPECTED LOCATION CONTEXTUAL INDICATOR(S) operation 506.

In GENERATE KNOWN LOCATION CONTEXTUAL INDICATOR(S) AND EXPECTED LOCATION CONTEXTUAL INDICATOR(S) operation 506, local contextual indicator application 114 generates one or more known location contextual indicators and one or more expected location contextual indicators based respectively on at least a portion of the known location contextual data and at least a portion of the expected location contextual data obtained in operation 504 as earlier respectively described with reference to operations 314 (FIG. 3) and 406 (FIG. 4), hereby incorporated by reference. From GENERATE KNOWN LOCATION CONTEXTUAL INDICATOR(S) AND EXPECTED LOCATION CONTEXTUAL INDICATOR(S) operation 506, processing transitions to a PROVIDE KNOWN LOCATION CONTEXTUAL INDICATOR(S) AND EXPECTED LOCATION CONTEXTUAL INDICATOR(S) TO RELYING PARTY (IES) operation 508.

In PROVIDE KNOWN LOCATION CONTEXTUAL INDICATOR(S) AND EXPECTED LOCATION CONTEXTUAL INDICATOR(S) TO RELYING PARTY(IES) operation 508, one or more of the known location contextual indicators and the expected location contextual indicators generated in operation 506 are provided to one or more relying parties as earlier respectively described with reference to operations 316 (FIG. 3) and 408 (FIG. 4), hereby incorporated by reference. From PROVIDE KNOWN LOCATION CONTEXTUAL INDICATOR(S) AND EXPECTED LOCATION CONTEXTUAL INDICATOR(S) TO RELYING PARTY(IES) operation 508, processing transitions to an EXIT operation 510 with processing exiting method 500 as earlier described, or optionally returning to operation 304 (FIG. 5) on receipt of a next user log-in.

Although the above embodiment is described with both known location contextual data and expected location contextual data being available for collection, it can be understood that at times known location contextual data or expected location data may not be available. In those instances, contextual indicator(s) are generated based on the available contextual data. For example, where known location contextual data is the only contextual data available, known location contextual indicators are generated, but not expected location contextual indicators. As another example, where expected location contextual data is the only contextual data available, expected location contextual indicators are generated, but not known location contextual indicators.

Referring again to FIG. 1, local contextual indicator application 114 is in memory 112. As used herein, a computer memory refers to a volatile memory, a non-volatile memory, or a combination of the two. Although local contextual indicator application 114 is referred to as an application, this is illustrative only. Local contextual indicator application 114 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client configuration, an embodiment of the present invention may be carried out using any suitable means and/or hardware configuration involving a personal computer, a workstation, a portable device, or a network of computer devices. Other network configurations other than client configurations, e.g., client-server, peer-to-peer, web-based, intranet, Internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible storage medium configured to store computer readable code including CD-ROM discs, DVDs, ROM cards, floppy discs, magnetic tapes, computer hard drives and servers on a network.

As illustrated in FIG. 1, this medium may belong to the computer system itself. However, the medium also may be removed from the computer system. For example, local contextual indicator application 114 may be stored in memory 138 that is physically located in a location different from processor 108. Processor 108 should be coupled to the memory 138. This could be accomplished in a client-server system, or alternatively via a connection to another computer via modems and analog lines, or digital interfaces and a digital carrier line.

More specifically, in one embodiment, client device 102 and/or server computer system 134 and/or computer system 130 and/or remote contextual data source(s) 142A-142n are a portable computer, a workstation, a two-way pager, a cellular telephone, a digital wireless telephone, a personal digital assistant, a server computer, an Internet appliance, or any other device that includes components that can execute the functionality in accordance with at least one of the embodiments as described herein. Similarly, in another embodiment, client device 102 and/or server computer system 134 and/or system 130 and/or remote contextual data source(s) 142A-142n are comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionalities of local contextual indicator application 114 in accordance with the embodiments of the present invention can be implemented in a wide variety of computer system configurations. In addition, the functionalities of local contextual indicator application 114 could be stored as different modules in memories of different devices. For example, local contextual indicator application 114 could initially be stored in computer system 134, and then as necessary, a portion of local contextual indicator application 114 could be transferred to client device 102 and executed on client device 102. Consequently, part of the functionality of local contextual indicator application 114 would be executed on a processor of a different computer system, and another part would be executed on processor 108 of client device 102.

In view of this disclosure, those of skill in the art can implement various embodiments of the present invention in a wide-variety of physical hardware configurations using an operating system and computer programming language of interest to the user. In yet another embodiment, local contextual indicator application 114 is stored in memory 138 of server computer system 134. Local contextual indicator application 114 is transferred over network 128 to memory 112 in client device 102. In this embodiment, I/O interface 140 and I/O interface 110 would include analog modems, digital modems, or a network interface card. If modems are used, network 128 includes a communications network, and local contextual indicator application 114 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
   executing, on a processor of a user device, a local contextual indicator application, wherein said executing includes:
   obtaining, by said executing local contextual indicator application, contextual data associated with a location of a user of the user device from at least one contextual data source accessible by said executing local contextual indicator application;
   obtaining expected location contextual data associated with said user, said expected location contextual data including at least one of an expected physical location of said user and an expected location time period associated with said expected physical location;
   generating, by said executing local contextual indicator application, at least one contextual indicator associated with a location of said user based on at least a portion of said contextual data; and
   providing, by said executing local contextual indicator application, said at least one contextual indicator to a relying party at a specified frequency without first receiving a request from the at least one relying party for the at least one contextual indicator,
   wherein the at least one relying party is an anti-fraud system, and further wherein said at least one contextual indicator is for use by said anti-fraud system in determining whether a transaction associated with said user is fraudulent.

2. The computer-implemented method of claim 1 wherein said obtaining contextual data associated with a location of a user from said at least one contextual data source comprises:
   obtaining known location contextual data associated with said user, said known location contextual data including at least one of a known physical location of said user and a known location time period associated with said known physical location.

3. The computer-implemented method of claim 2 wherein said generating at least one contextual indicator associated with a location of said user based on at least a portion of said contextual data comprises:
   generating at least one known location contextual indicator based on at least a portion of said known location contextual data.

4. The computer-implemented method of claim 1 wherein said generating at least one contextual indicator associated with a location of said user based on at least a portion of said contextual data comprises:
   generating at least one expected location contextual indicator based on at least a portion of said expected location contextual data.

5. The computer-implemented method of claim 1 wherein said obtaining contextual data associated with a location of a user from said at least one contextual data source comprises:
   obtaining known location contextual data associated with a known location of said user, and
   obtaining expected location contextual data associated with at least one expected location of said user; and
   wherein said generating at least one contextual indicator associated with a location of said user based on at least a portion of said contextual data comprises:
   generating at least one known location contextual indicator associated with a known location of said user based on at least a portion of said known location contextual data, and
   generating at least one expected location contextual indicator associated with at least one expected location of said user based on at least a portion of said expected location contextual data.

6. The computer-implemented method of claim 1 wherein said at least one contextual data source is a local contextual data source.

7. The computer-implemented method of claim 1 wherein said at least one contextual data source is a remote contextual data source.

8. The computer-implemented method of claim 1 further comprising:
   receiving a user log-in for the user of the user device;
   requesting user authentication data;
   receiving said user authentication data;
   determining whether said user is authenticated based on said user authentication data;
   wherein when said user is authenticated; and
   wherein when said user is not authenticated, exiting said computer-implemented method.

9. A computer-implemented method comprising:
   executing, on a processor of a user device, a local contextual indicator application, wherein said executing includes:
   obtaining, by said executing local contextual indicator application, expected location contextual data associated with a user of the user device from at least one contextual data source accessible by said executing local contextual indicator application, said expected location contextual data including at least one of an expected physical location of said user and an expected location time period associated with said expected physical location;
   generating, by said executing local contextual indicator application, at least one expected location contextual indicator based on at least a portion of said expected location contextual data; and
   providing, by said executing local contextual indicator application, said at least one expected location contextual indicator to at least one relying party at a specified frequency without first receiving a request from the at least one relying party for the at least one contextual indicator,
   wherein the at least one relying party is an anti-fraud system, and further wherein said at least one expected location contextual indicator is for use by said anti-fraud system in determining whether a transaction associated with said user is fraudulent.

10. The computer-implemented method of claim 9 wherein said at least one contextual data source is a local contextual data source.

11. The computer-implemented method of claim 9 wherein said at least one contextual data source is a remote contextual data source.

12. The computer-implemented method of claim 9 further comprising:
   receiving a user log-in for the user of the user device;
   requesting user authentication data;
   receiving said user authentication data;
   determining whether said user is authenticated based on said user authentication data;
      wherein when said user is authenticated, allowing said computer-implemented method to continue; and
      wherein when said user is not authenticated, exiting said computer-implemented method.

13. A computer-implemented method comprising:
   executing, on a processor of a user device, a local contextual indicator application, wherein said executing includes:
      obtaining, by said executing local contextual indicator application, known location contextual data associated with a user of the user device from at least one contextual data source accessible by said executing local contextual indicator application, said known location contextual data including at least one of a known physical location of said user and a known location time period associated with said expected physical location;
      generating, by said executing local contextual indicator application, at least one known location contextual indicator based on at least a portion of said known location contextual data; and
      providing, by said executing local contextual indicator application, said at least one known location contextual indicator to at least one relying party at a specified frequency without first receiving a request from the at least one relying party for the at least one contextual indicator,
         wherein said the at least one relying party is an anti-fraud system, and further wherein said at least one known location contextual indicator is for use by said anti-fraud system in determining whether a transaction associated with said user is fraudulent.

14. The computer-implemented method of claim 13 wherein said at least one contextual data source is a local contextual data source.

15. The computer-implemented method of claim 13 wherein said at least one contextual data source is a remote contextual data source.

16. The computer-implemented method of claim 13 further comprising:
   receiving a user log-in for the user of the user device;
   requesting user authentication data;
   receiving said user authentication data;
   determining whether said user is authenticated based on said user authentication data;
      wherein when said user is authenticated, allowing said computer-implemented method to continue; and
      wherein when said user is not authenticated, exiting said computer-implemented method.

* * * * *